United States Patent
Frey et al.

(10) Patent No.: US 10,590,888 B2
(45) Date of Patent: Mar. 17, 2020

(54) THRUST NOZZLE WITH DOUBLE CONTOUR AND SMOOTH TRANSITION

(71) Applicant: Airbus DS GmbH, Taufkirchen (DE)

(72) Inventors: Manuel Frey, Munich (DE); Thomas Aichner, Munich (DE); Philip Martin, Munich (DE)

(73) Assignee: Airbus DS GmbH, Taufkirchen (DE)

( * ) Notice: Subject to any disclaimer, the term of this patent is extended or adjusted under 35 U.S.C. 154(b) by 366 days.

(21) Appl. No.: 15/268,737

(22) Filed: Sep. 19, 2016

(65) Prior Publication Data
US 2017/0122260 A1    May 4, 2017

(30) Foreign Application Priority Data
Sep. 18, 2015    (DE) .................. 10 2015 011 958

(51) Int. Cl.
  *F02K 9/97* (2006.01)
  *F02K 9/80* (2006.01)
  *F02K 9/60* (2006.01)

(52) U.S. Cl.
  CPC .................. *F02K 9/97* (2013.01); *F02K 9/60* (2013.01); *F02K 9/80* (2013.01); *F05D 2250/16* (2013.01); *F05D 2250/26* (2013.01)

(58) Field of Classification Search
  CPC ..... F02K 9/60; F02K 9/80; F02K 9/97; F05D 2250/16; F05D 2250/26
  See application file for complete search history.

(56) References Cited

U.S. PATENT DOCUMENTS

| 6,574,964 B1 * | 6/2003 | Haggander | ............... F02K 9/97 239/265.11 |
| 2001/0023583 A1 | 9/2001 | Haggander et al. | |
| 2012/0168526 A1 * | 7/2012 | Fisenko | ................... F04F 5/10 239/1 |

FOREIGN PATENT DOCUMENTS

| WO | 9812429 | 3/1998 |
| WO | 0034641 | 6/2000 |

OTHER PUBLICATIONS

Reijasse, P. et al., Wall PRessure and Thrust of a Dual Bell Nozzle in a Cold Gas Facility, 2011, EDP Sciences, Progress in Propulsion Physics 2, 655-674 (Year: 2011).*
Frey, Manuel, "Behandlung von Strömungsproblemen in Raketendüsen bei Überexpansion" (Dealing with Flow Problems in Rocket Nozzles in the Event of Overexpansion), dissertation, University of Stuttgart, 2001, pp. 22 to 27.
European Search Report, dated Feb. 2, 2017, Priority Document.
"Hot Flow testing of dual bell nozzles", Chloe Genin et al.
German Office Action, dated Jun. 14, 2016.
Nasuti, F. "Numerical Study of transition Between the two Operating Modes of Dual-Bell Nozzles", 2002.

* cited by examiner

*Primary Examiner* — William H Rodriguez
*Assistant Examiner* — Kyle Robert Thomas
(74) *Attorney, Agent, or Firm* — Greer, Burns & Crain Ltd.

(57) ABSTRACT

A thrust nozzle, in particular thrust nozzle for a rocket engine, with a convergent wall section, a throat section and a divergent wall section. The divergent wall section has a first region adjacent to the throat section, the wall contour of which region corresponds to a truncated ideal nozzle, and the divergent wall section has a second region facing away from the throat section, which region has a wall contour deviating from the first region.

2 Claims, 5 Drawing Sheets

THRUST NOZZLE WITH DOUBLE CONTOUR AND SMOOTH TRANSITION

CROSS-REFERENCES TO RELATED APPLICATIONS

This application claims the benefit of the German patent application No. 10 2015 011 958.3 filed on Sep. 18, 2016, the entire disclosures of which are incorporated herein by way of reference.

TECHNICAL FIELD

The present invention relates to a thrust nozzle, in particular a thrust nozzle for a rocket engine.

BACKGROUND OF THE INVENTION

Thrust nozzles of rocket engines are formed as convergent-divergent expansion nozzles. These nozzles produce optimal thrust when the ambient pressure is of the same magnitude as the average pressure in the nozzle outlet plane. The flow is attached everywhere close to the nozzle wall and does not experience any change of direction at the nozzle outlet in the case of a uniform velocity distribution. If the nozzle outlet pressure is above the ambient pressure, then the gas exit velocity is lower than in the case of the nozzle flow adapted to the ambient pressure. If the nozzle outlet pressure is lower than the ambient pressure, on the other hand, then although the gas exit velocity is higher than in the case of the adjusted nozzle flow, the constriction of the exhaust gas jet that occurs can result in a flow separation. In this case, no separation occurs initially. Only when the pressure at the nozzle end falls to below 40% of the ambient pressure does separation occur. However, once it falls below the ambient pressure, the thrust is no longer optimal.

Flow separations from the wall of the thrust nozzle should be avoided, however, as lateral forces occur that do not act in the desired thrust direction on the rocket engine and can lead to mechanical damage.

The wall contour of the thrust nozzle exerts a substantial influence on the flow progression in the inside of the thrust nozzle and in particular in its divergent section.

Two different contouring methods have basically existed up to now for thrust nozzles, namely a thrust-optimized parabola (TOP) and a so-called truncated ideal nozzle (Truncated Ideal Contour, TIC).

Flow separation and lateral forces occur in principle on start-up of a nozzle, regardless of which type it is. The lateral forces, in particular, can be of different magnitude here depending on the contouring type (TIC or TOP). Normally the aim is to design nozzles in such a way that flow separation is prevented in stationary operation.

Parabolic TOP nozzles generally attain a high nozzle outlet pressure and, if necessary, the nozzle outlet pressure can be increased further by reducing the outlet angle, which is a basic design criterion for avoiding flow separations. At the same time, however, a TOP nozzle produces an internal shock, which can produce a flow separation with subsequent reattachment of the flow to the wall. Especially high lateral forces are generated by this, which can be hazardous for the operation of the rocket engine.

The truncated ideal nozzle (TIC nozzle), on the other hand, is shock-free and prevents the undesirable separation of the flow caused by the particularly high lateral forces arising with subsequent reattachment to the wall. On start-up of a TIC nozzle, only moderate lateral forces therefore occur.

However, with the same length of the divergent section of a thrust nozzle and same radius of the end point, a much lower nozzle pressure results with a TIC nozzle than with a TOP nozzle, which leads to the possibility of flow separations occurring in stationary operation with the TIC nozzle.

When designing the nozzle contour of a rocket engine launched on the ground, thus for the rocket engines of the first rocket stage, the unavoidable lateral forces during the start-up should be kept as small as possible, which can be achieved by suppressing the internal shock, so that a flow separation with reattachment is prevented.

A flow separation in stationary operation, meaning on reaching full combustion chamber pressure, should be avoided and in addition the highest possible specific vacuum impulse should be aimed for in stationary operation. Nozzles currently in existence, thus both TOP nozzles and TIC nozzles, cannot fulfill these design criteria simultaneously.

While the wall contour of parabolic TOP nozzles has the form of a quadratic parabola or a higher-order parabola in longitudinal section, the contour of ideal nozzles (TIC nozzles) cannot be described by simple mathematical functions. A design specification for an ideal TIC nozzle has been previously published in: Frey, Manuel, "Behandlung von Strömungsproblemen in Raketendüsen bei Überexpansion" (Dealing with Flow Problems in Rocket Nozzles in the Event of Overexpansion), dissertation, University of Stuttgart, 2001, pages 22 to 27. According to the design specification for ideal nozzles (TIC nozzles) provided there, ideal nozzles are designed using the method of characteristics.

FIG. 2 shows such a design of an ideal rotationally symmetrical nozzle 100, through which a flow passes in the direction of the arrow P from the convergent nozzle section through the throat section to the divergent nozzle section. For the contour of the wall 103 at the narrowest point of the nozzle 100, the nozzle throat 102, a circular arc 104 with a predetermined radius is assumed as default. However, the predetermined radius can also have the value 0, wherein the wall of the convergent section then passes, forming a point of discontinuity creating the throat, directly into the wall of the divergent section.

From the nozzle throat 102 of the example shown in FIG. 2, expansion waves run towards the nozzle longitudinal axis 101, at which they are reflected. The region K upstream of the so-called characteristic last expansion wave propagation line 106, which proceeds from the last point 105 of the circular arc 104 situated in the divergent nozzle section, is termed "kernel." Expansion waves occur in this kernel region. In FIG. 2 this is the region between the cross-sectional plane E1 at the narrowest throat diameter and the last expansion wave propagation line 106.

The section 108 of the wall 103 downstream of the last point 105 of the circular arc 104 is curved in such a way towards the nozzle longitudinal axis 101 that the expansion waves reflected by the nozzle longitudinal axis and arriving at the wall 103 are immediately cancelled by the compressing wall contour in the section 108. As a consequence, downstream of the last expansion wave reflection-propagation line 107 of the last expansion wave reflected by the nozzle longitudinal axis 101, a parallel flow prevails, and the flow corresponds to the design state. For this reason, this last expansion wave reflection-propagation line 107 is also termed "design characteristic." At the wall end point 109 where this last expansion wave reflection-propagation line 107 encounters the wall 103, the outlet plane E2 lies in the cross section of the nozzle.

The overall nozzle contour is already determined by the choice of the divergence angle (tangential angle on the circular arc 104) in the end point 105 of the circular arc 104. At a predetermined state in the combustion chamber, there is precisely one contour that can deflect the kernel flow determined by this end point 105 into a parallel flow, namely the ideal contour. If a chosen wall contour is less curved than the related ideal, expansion waves are reflected by the wall 103 into the flow field. However, if it is more strongly curved, compression waves run from the wall 103 into the flow field.

SUMMARY OF THE INVENTION

An object of the present invention, therefore, is to configure a generic thrust nozzle in such a way that the aforesaid design criteria are fulfilled, namely that while minimizing the risk of stationary flow separation and the occurrence of lateral forces associated with this, as well as minimizing the unavoidable lateral forces on start-up (suppression of the separation with reattachment), a maximum specific vacuum impulse, thus a maximum thrust, can be achieved, in particular even in stationary operation.

The thrust nozzle according to the invention, which can be provided, in particular, as a thrust nozzle for a rocket engine, is provided with a convergent wall section, a throat section and a divergent wall section, wherein the divergent wall section has a first region adjacent to the throat section, the wall contour of which corresponds to the wall contour of a truncated ideal nozzle, and wherein the divergent wall section has a second region facing away from the throat section, which region has a wall contour deviating from the first region. The wall contour of this second region is thus not a wall contour of an ideal TIC nozzle, but a wall contour deviating from this.

The combination, according to the invention, of the first region of the divergent wall section, which region is adjacent to the throat of the thrust nozzle and corresponds to the wall contour of a truncated ideal nozzle, with a connecting section downstream with a deviating wall contour ensures, on the one hand, that, in the critical first region at the widening of the nozzle cross section, the occurrence of shocks and thus the hazardous separation with reattachment on account of particularly high lateral forces are suppressed due to the TIC nozzle contour there and that downstream of this, in the second region, if only a relatively small enlargement of the nozzle cross section occurs, the nozzle contour can be designed in such a way that the outlet pressure is sufficiently high to prevent flow separation in stationary operation.

The contour angle of the divergent wall section, seen in longitudinal section through the thrust nozzle, preferably runs continuously on the transition from the first region to the second region. The contour angle is defined by a tangential angle to the wall of the thrust nozzle. Hence, a first derivative of a curve describing the wall contour of the thrust nozzle along a length, i.e., along a longitudinal axis of the nozzle, describes the development of the contour angle or tangential angle along the length, i.e., along the longitudinal axis of the nozzle. A curvature of the curve describing the wall contour of the thrust nozzle along its length is described by the second derivative of said curve. The first derivative of the curve describing the wall contour of the thrust nozzle preferably is continuous at a transition point between the first region and the second region. A second derivative of the curve describing the wall contour of the thrust nozzle, however, may comprise a kink. The steady transition between the two regions of the divergent wall section reduces the risk of the occurrence of internal pressure shocks and a flow separation associated with this.

A variant of the thrust nozzle is particularly preferred in which the second region of the divergent wall section is paraboloid-shaped. This paraboloid-shaped configuration corresponds to the contour of a thrust-optimized parabola. Such a thrust nozzle thus combines in the first region close to the throat the properties of a TIC nozzle with the properties of a TOP nozzle in the second region downstream.

As already indicated above, according to a preferred embodiment of the trust nozzle, the transition from the wall contour of the first region to the wall contour of the second region is continuous, i.e., the development of the first derivative of the curve describing the wall contour of the thrust nozzle is continuous. The contour angle α corresponding to a tangential angle to the wall, at the last point of the wall contour of the first region, hence may correspond to the contour angle α at the first point of the wall contour of the second region. By choosing the transition between the first and the second region as being continuous and having the same contour angle α in the last point of the first region and in the first point of the second region, the truncated ideal nozzle (TIC) and the thrust-optimized nozzle (TOP) can be combined in an advantageous manner. The combination of both nozzle contours improves the functioning of the thrust nozzle.

A preferred use of the thrust nozzle according to the invention is realized in a rocket engine, so that the invention also comprises a rocket engine with a thrust nozzle according to the invention.

Preferred practical examples of the invention with additional configuration details and other advantages are described and explained in greater detail below with reference to the enclosed drawings.

BRIEF DESCRIPTION OF THE DRAWINGS

FIG. 1A shows the section A from FIG. 1.

DETAILED DESCRIPTION OF THE PREFERRED EMBODIMENTS

Figure 1:
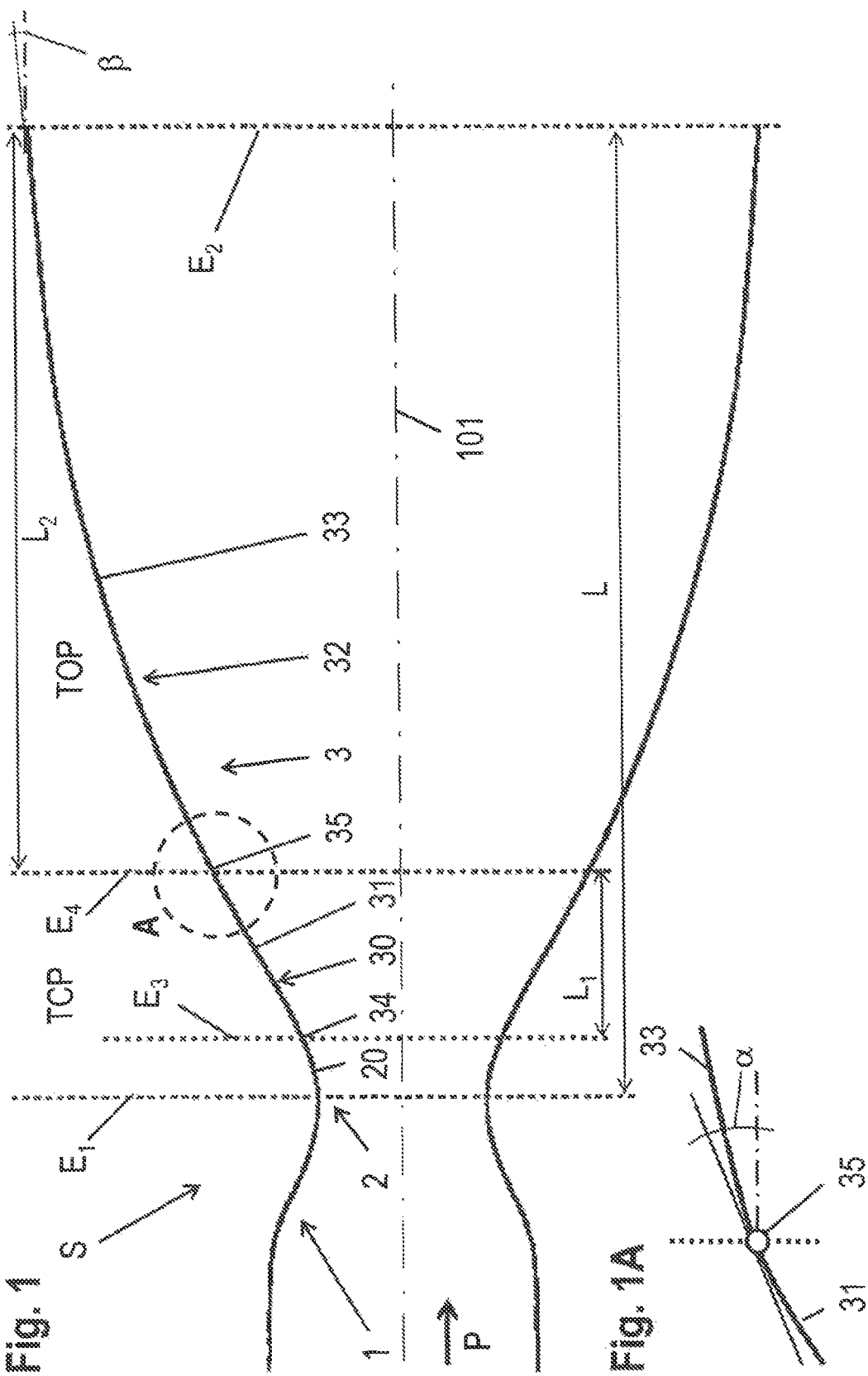
FIG. 1 shows a thrust nozzle according to the invention.

A thrust nozzle S according to the invention is shown in longitudinal section in FIG. 1, wherein the nozzle wall is drawn only as a contour line and permits no conclusion as to the design configuration of the nozzle wall (material construction, cooling ducts, etc.). The construction of nozzle walls, especially of rocket thrust nozzles, is sufficiently known and is not an object of the present invention.

The nozzle has a convergent wall section 1, a throat section 2 and a divergent wall section 3. The narrowest cross section of the nozzle is located in the throat section 2 in the cross-sectional plane E1 at the narrowest diameter of the throat section 2. The passage of flow through the nozzle is in the direction of the flow arrow P from the nozzle section with the convergent wall section 1 through the nozzle throat to the nozzle section with the divergent wall section 3. A combustion chamber situated ahead of the nozzle section with the convergent wall section 1 in a rocket engine is not shown in FIG. 1, but is sufficiently known to the person skilled in the art.

As already described in connection with the prior art in FIG. 2, the wall contour 20 in the throat section 2 is executed as a circular arc. Connected to this circular arc of the wall contour 20 of the throat section 2 in a downstream direction, thus towards the divergent wall section 3, is a first region 30 of the divergent wall section 3, the wall contour 31 of which—as already described in connection with FIG. 2—is formed as a truncated ideal nozzle (TIC nozzle). The transition from the circular-arc-shaped wall contour 20 of the throat section 2 to the wall contour 31 of the first region 30 formed as a truncated TIC nozzle is defined by a first transition point 34, through which a first transition cross-sectional plane E3 runs.

The transition from the circular-arc-shaped wall contour 20 of the throat section 2 to the wall contour 31 of the first region 30 is realized continuously; this means that the tangential angle (in the longitudinal sectional plane shown in FIG. 1) at the last point of the circular-arc-shaped wall contour 20 of the throat section 2 corresponds to the tangential angle at the first point of the wall contour 31 of the first region 30.

Figure 2:
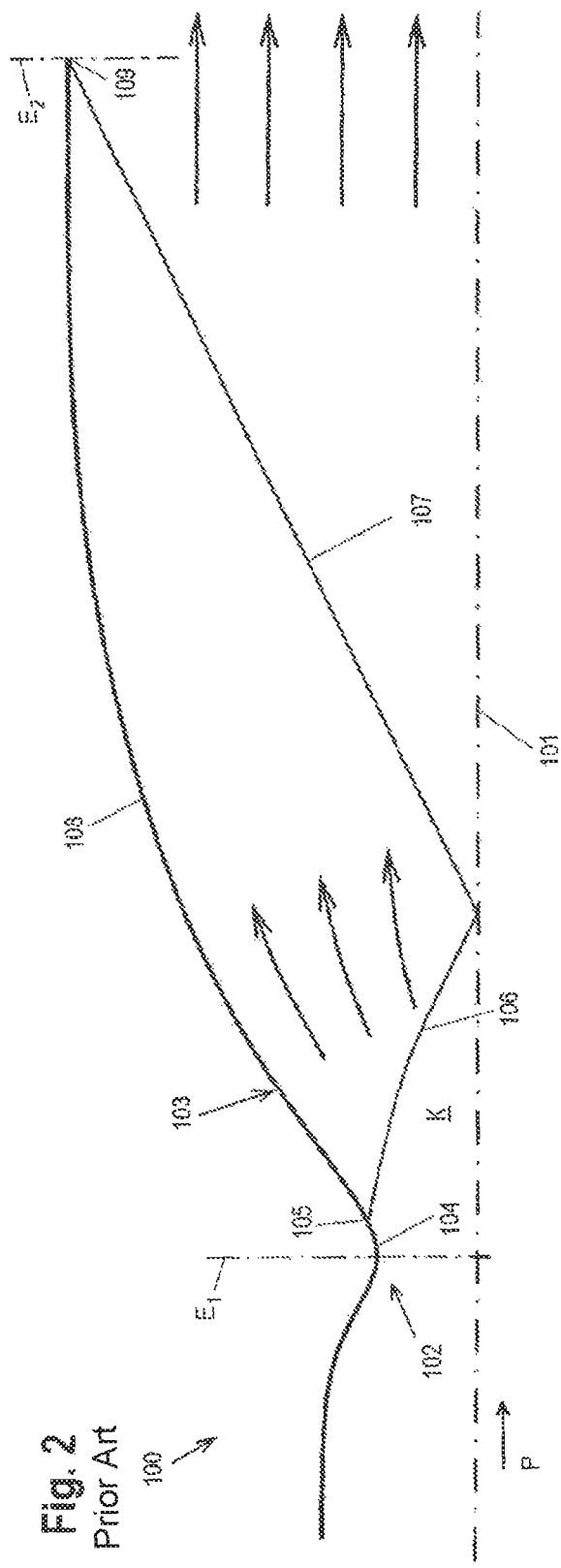
FIG. 2 shows a previously known ideal nozzle.

The first region 30 with the contour of a truncated ideal nozzle extends in the direction of the nozzle longitudinal axis 101, but not over the full length of a TIC nozzle as shown in FIG. 2 and described in connection with FIG. 2, but only over a portion of the length of an ideal nozzle close to the throat. The axial length L1 of the first region 30 is determined according to a design specification, which is described further below.

Adjoining the first region 30 of the divergent wall section 3 at the end of the first region 30 facing away from the throat section 2 is a second region 32 of the divergent wall section 3, which has a wall contour 33 deviating from the first region 30 and thus also from an ideal TIC nozzle. The transition between the wall contour 31 of the first region 30 and the wall contour 33 of the second region 32 of the divergent wall section 3 is realized at a second transition point 35, through which a second transition cross-sectional plane E4 runs.

The transition from the wall contour 31 of the first region 30 to the wall contour 33 of the second region 32 is continuous. This means that the contour angle α, that is the tangential angle (in the longitudinal sectional plane shown in FIG. 1) to the wall at the last point of the wall contour 31 of the first region corresponds to the contour angle α at the first point of the wall contour 33 of the second region 32, as is to be seen in the enlarged representation in FIG. 1A.

In the example of FIG. 1, the wall contour 33 of the second region 32 is formed as a quadratic parabola. This second region 32 configured in a paraboloid shape of the divergent wall section 3 extends in the direction of the nozzle longitudinal axis 101 over a length L2 as far as the outlet plane E2. The position of this outlet plane E2 is determined by the predetermined overall length L of the nozzle, measured from the plane E1 to the plane E2.

The design of such a combined TICTOP thrust nozzle according to the invention and, in particular, the determination of the second transition point 35 with the second transition cross-sectional plane E4 is described below.

In the design process of a thrust nozzle, the nozzle throat cross section, the nozzle length and the nozzle outlet diameter are normally preset. The start and end point of the nozzle according to the invention are thus fixed. Thus three parameters remain as free parameters in the design process, namely:

1. The first free parameter is the design Mach number of the ideal nozzle. The greater the design Mach number, the more divergent (at the same axial length L1) is the first region 30 formed as a truncated ideal nozzle, i.e., the greater the divergence angle at the first transition point 34 between the circular-arc-shaped wall contour 20 of the throat section 2 and the wall contour 31 of the first region 30, thus the truncated ideal nozzle. Due to this the greater the contour angle α is also at the second transition point 35 between the wall contour 31 of the first region 30 and the wall contour 33 of the paraboloid-shaped second region 32 of the divergent wall section 3.

2. The second free parameter is the axial length L1 of the thrust nozzle S in the first region 30, thus of the truncated ideal nozzle used, and thus the axial position of the second transition point 35.

3. The third free parameter is the divergence angle β of the paraboloid-shaped wall contour 33 of the second region 32 at the open outlet end of the thrust nozzle, thus in the area of the outlet plane E2. The nozzle end pressure can be varied by this value. The smaller the divergence angle β is at a constant nozzle length L, the higher the nozzle end pressure.

The starting point (second transition point 35) and the starting angle (contour angle α) of the paraboloid-shaped second region 32 of the divergent wall section 3 are determined here by the end point and the end angle of the truncated ideal nozzle, thus of the first region 30. This point is the second transition point 35. In principle it would also be possible to permit a small angle change outwards at the second transition point 35. This would add another degree of freedom for the design. However, the further the nozzle is opened at the second transition point 35, thus the greater the change in the contour angle α at this point, the greater the risk that a shock is induced in the further progression of the paraboloid-shaped second region 32 that would nullify the advantages of the contouring method described.

The end point of the paraboloid-shaped second region 32 is normally predetermined in the design process on account of the predetermined nozzle length L and the predetermined opening cross section of the nozzle in the outlet plane E2.

Upstream of the second transition point 35, a wall contour of a truncated ideal nozzle should necessarily be chosen up to the first transition point 34, because only this guarantees shock-free operation. Downstream of the second transition point 35, a wall contour must be selected which contains the three fixed design parameters, namely the starting point, the starting angle and the end point of the wall contour and in which the third free parameter (divergence angle β) can be varied. This doesn't necessarily have to be an oblique parabola of the second degree, but this is an obvious choice. Alternatively, the wall of the second region 32 could also be described by a higher-order curve when seen in cross section.

The thrust nozzle according to the invention shown in FIG. 1 thus combines the advantages of an ideal nozzle (TIC nozzle) with the advantages of a TOP nozzle with paraboloid wall contour and can therefore be described as a TICTOP nozzle.

Figure 3:
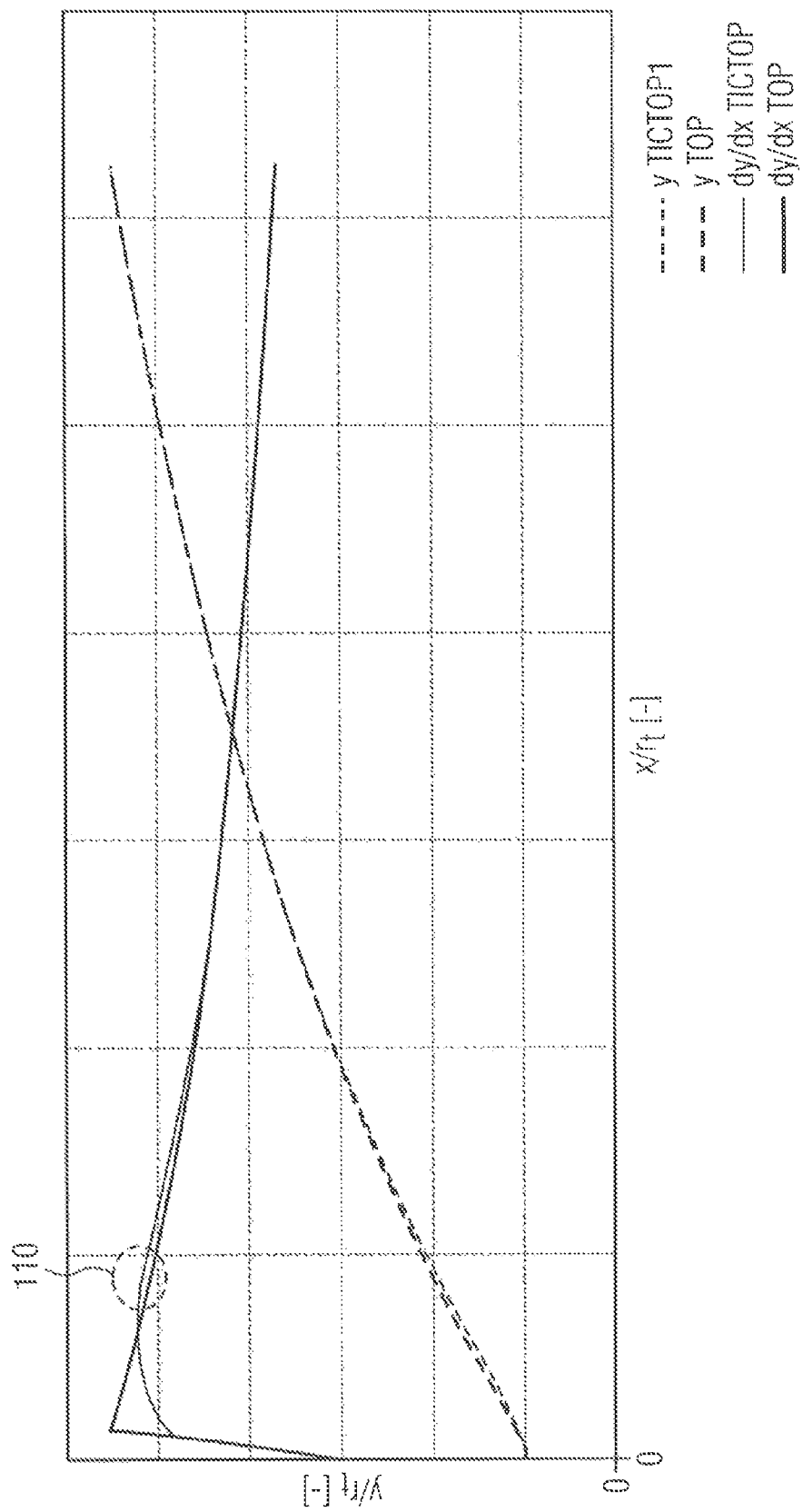
FIG. 3 shows the contour of a first exemplary thrust nozzle according to the invention in comparison with a TOP thrust nozzle.
Figure 4:
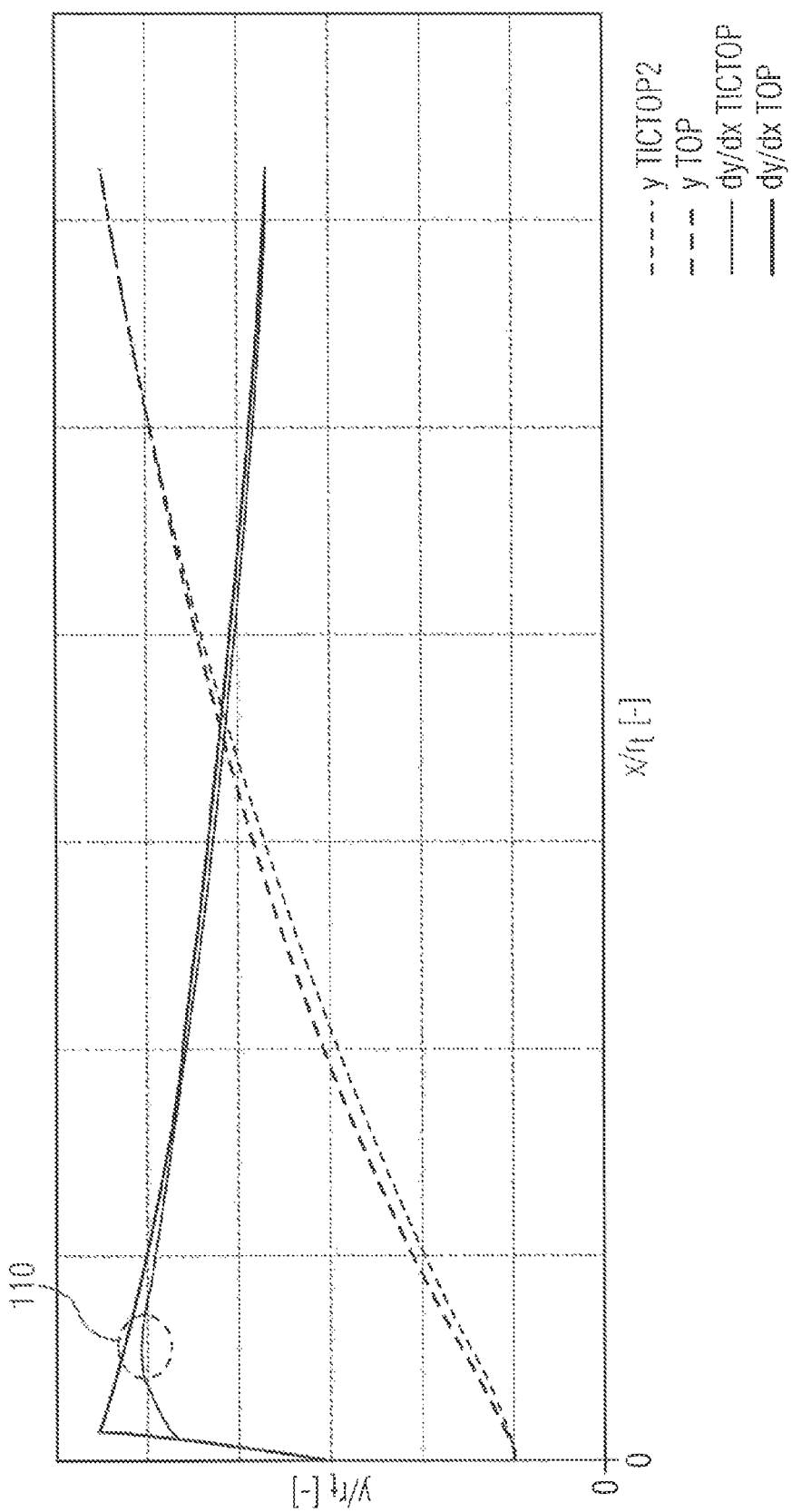
FIG. 4 shows the contour of a second exemplary thrust nozzle according to the invention in comparison with a TOP thrust nozzle.

FIGS. 3 and 4 illustrate the contour of two examples of the combined TICTOP thrust nozzle according to the invention compared to the TOP thrust nozzle with the same exit point. The dashed lines correspond to the contour (31, 33) y as a function of the length-coordinate x of the respective thrust nozzle, while the solid lines correspond to the first derivative dy/dx of the curve. The transition between the TIC and the parabolic nozzle section can be identified in the first derivative, since the first derivative shows a kink at the transition point from the TIC to the parabolic nozzle section. This transition is surrounded by the circle 110.

Figure 5:
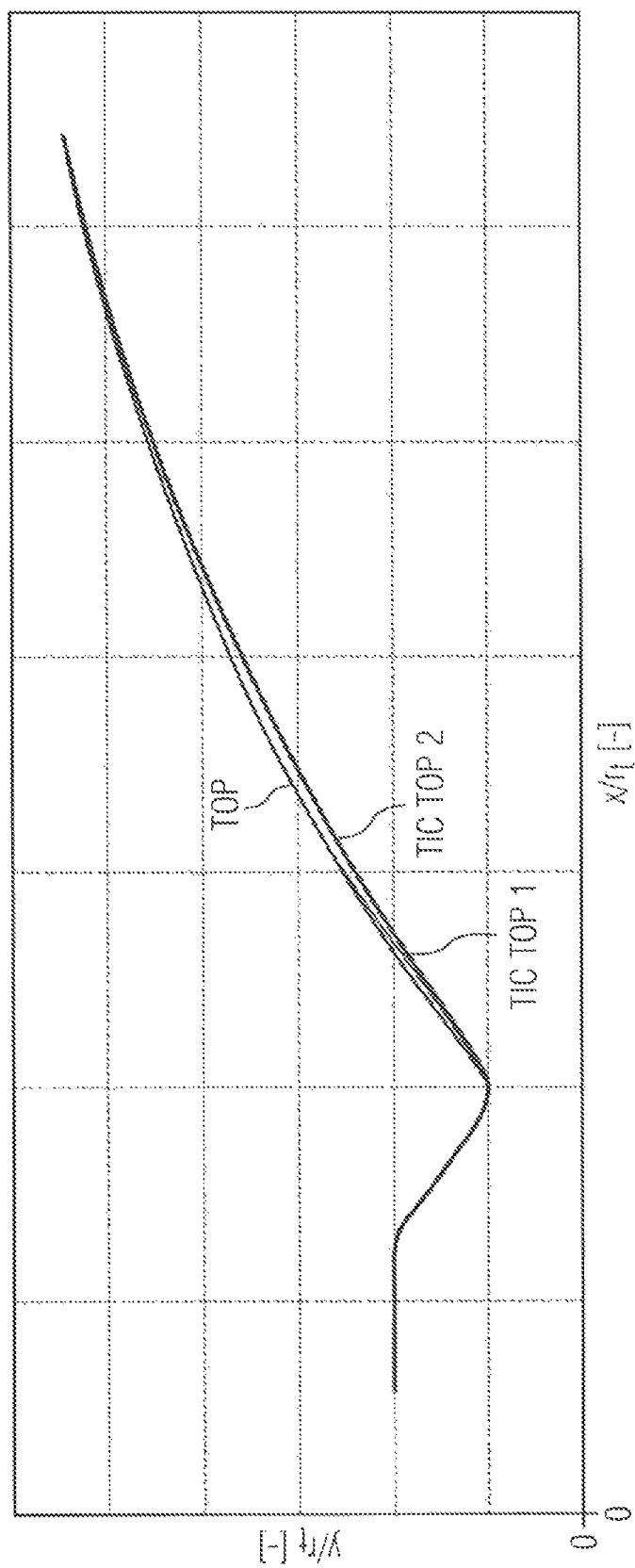
FIG. 5 shows the contour of the two exemplary thrust nozzles according to the invention as shown in FIGS. 3 and 4 in comparison with a TOP thrust nozzle.

FIG. 5 illustrates the contour of the TOP thrust nozzle in comparison with the two examples of the TICTOP thrust nozzle of FIGS. 3 and 4. As becomes apparent from FIGS. 3 to 5, the TICTOP thrust nozzle is provided with a contour (31, 33) line in the transition region between the first and the second region (30, 32) that lies well below the contour line of the TOP thrust nozzle, while upstream and downstream of the transition point, the contour line (31, 33) of the TICTOP thrust nozzles converges against the contour line of the TOP thrust nozzle.

Reference signs in the description and the drawings serve only for a better understanding of the invention and are not intended to limit the protective scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Convergent wall section
2 Throat section
3 Divergent wall section
20 Wall contour of the throat section
30 First region
31 Wall contour of the first region
32 Second region
33 Wall contour of the second region
34 First transition point
35 Second transition point
100 Rotationally symmetrical nozzle
101 Nozzle longitudinal axis
102 Nozzle throat
103 Wall
104 Circular arc
105 Point
106 Expansion wave propagation line
107 Expansion wave reflection propagation line
108 Section of the wall contour
109 Wall end point
110 Circle indication the transition from TIC to TOP
α Contour angle
β Divergence angle
$E_1$ Cross-sectional plane at the narrowest throat diameter
$E_2$ Outlet plane
$E_3$ Transition cross-sectional plane
$E_4$ Second transition cross-sectional plane
K "Kernel" region
L Overall length of nozzle
$L_1$ Axial length of the first region
$L_2$ Axial length of the second region
P Flow arrow
S Thrust nozzle

The invention claimed is:

1. A thrust nozzle comprising:
a convergent wall section downstream of a combustion chamber of a rocket engine,
a throat section and
a divergent wall section, wherein
the divergent wall section has a first region adjacent to the throat section, wherein the wall contour of the first region corresponds to a truncated ideal nozzle, and
the divergent wall section has a second region facing away from the throat section, wherein the second region has a wall contour deviating from the wall contour of first region,
wherein a transition from the wall contour of the first region to the wall contour of the second region is continuous,
wherein a contour angle corresponding to a tangential angle to the wall, at a last point of the wall contour of the first region, corresponds to the contour angle at a first point of the wall contour of the second region,
wherein the contour angle of the divergent wall section, seen in longitudinal section through the thrust nozzle, runs continuously on the transition from the first region to the second region such that the contour angle at a last point of the wall contour in the first region and the contour angle at a first point of the wall contour in the second region are the same, and wherein the second region of the divergent wall section is paraboloid-shaped.

2. A rocket engine with a thrust nozzle comprising:
a convergent wall section downstream of a combustion chamber of the rocket engine,
a throat section and
a divergent wall section, wherein
the divergent wall section has a first region adjacent to the throat section, wherein the wall contour of the first region corresponds to a truncated ideal nozzle, and
the divergent wall section has a second region facing away from the throat section, wherein the second region has a wall contour deviating from the wall contour of first region,
wherein a transition from the wall contour of the first region to the wall contour of the second region is continuous,
wherein a contour angle corresponding to a tangential angle to the wall, at a last point of the wall contour of the first region, corresponds to the contour angle at a first point of the wall contour of the second region,
wherein the contour angle of the divergent wall section, seen in longitudinal section through the thrust nozzle, runs continuously on the transition from the first region to the second region such that the contour angle at a last point of the wall contour in the first region and the contour angle at a first point of the wall contour in the second region are the same, and wherein the second region of the divergent wall section is paraboloid-shaped.

* * * * *